US012764211B2

(12) United States Patent
Chen et al.

(10) Patent No.: US 12,764,211 B2
(45) Date of Patent: Oct. 13, 2026

(54) INTERNET OF THINGS SYSTEM AND CONTROL METHOD THEREOF

(71) Applicant: TECHTRONIC CORDLESS GP, Anderson, SC (US)

(72) Inventors: Zi Cong Chen, Dongguan (CN); Chao Wen, Dongguan (CN)

(73) Assignee: Techtronic Cordless GP, Anderson, SC (US)

( * ) Notice: Subject to any disclaimer, the term of this patent is extended or adjusted under 35 U.S.C. 154(b) by 274 days.

(21) Appl. No.: 18/597,199

(22) Filed: Mar. 6, 2024

(65) Prior Publication Data

US 2024/0333826 A1 Oct. 3, 2024

(30) Foreign Application Priority Data

Apr. 3, 2023 (CN) ........................ 202310347675.2

(51) Int. Cl.
*H04M 1/02* (2006.01)
*H04W 4/06* (2009.01)
*H04W 76/11* (2018.01)

(52) U.S. Cl.
CPC ........... *H04M 1/0262* (2013.01); *H04W 4/06* (2013.01); *H04W 76/11* (2018.02)

(58) Field of Classification Search
CPC ..... H04W 76/11; H04W 4/06; H04M 1/0262; H04M 1/02
See application file for complete search history.

(56) References Cited

U.S. PATENT DOCUMENTS

| | | | | |
|---|---|---|---|---|
| 8,626,144 | B2 * | 1/2014 | Talty ....................... | H04W 4/80 455/418 |
| 11,832,207 | B2 * | 11/2023 | DeGiovine ........... | H04W 4/025 |
| 2020/0301696 | A1 | 9/2020 | Yang et al. | |

OTHER PUBLICATIONS

Extended European Search Report for Application No. 24153155.7 dated Mar. 27, 2024 (7 pages).
Extended European Search Report for Application No. 26151619.9 dated Jun. 5, 2026 (9 pages).

* cited by examiner

*Primary Examiner* — Tuan H Nguyen
(74) *Attorney, Agent, or Firm* — Michael Best & Friedrich LLP

(57) ABSTRACT

A system including a battery pack provided with a connecting terminal and a wireless communication module, the battery pack configured to establish an electrical connection and communication connection with a terminal device via the connecting terminal and configured to issue broadcast information via the wireless communication module, the broadcast information including identity information of the terminal device connected to the battery pack.

15 Claims, 4 Drawing Sheets

INTERNET OF THINGS SYSTEM AND CONTROL METHOD THEREOF

TECHNICAL FIELD

The present invention relates to an IoT system and a control method therefor.

BACKGROUND ART

IoT (Internet of Things) is increasingly common in production and life nowadays. People may use smart phones, tablet computers and other electronic devices to establish a network connection with a production or everyday tool and monitor and control the tool by means of the electronic device, so as to be able to know information of the tool, such as operating state, in a timely manner. Generally, a wireless power supply mode for battery pack power supply and a networking mode of wireless network connections are used, to reduce space restrictions entailed by wired power supply and networking modes. However, each tool being equipped with a wireless communication module also produces a problem of increased costs. Therefore, a common battery pack is provided for different tools, and a wireless communication module is arranged on the battery pack, so that an electronic device establishes a network connection with the tools by means of the battery pack. However, when the tools operate for a long time, and it is necessary to frequently replace the battery pack, each time the battery pack is replaced, it is necessary to re-establish a network connection for the electronic device and tools, with the result that operation is more cumbersome.

Therefore, it is necessary to provide an IoT and control method therefor to mitigate the above problem.

SUMMARY OF THE INVENTION

An object of the present invention lies in providing an IoT system and control method therefor, with an electronic device in said system, by means of a frequently replaced battery pack, automatically wirelessly connecting to a terminal device connected to the battery pack, and it is thus possible to reduce unnecessary and cumbersome connecting operations by a user, providing convenience for controlling an IoT.

According to one aspect of the present invention, the IoT system comprises:

a battery pack, the battery pack being provided with a connecting terminal and a wireless communication module, the battery pack being configured to be capable of establishing an electrical connection and communication connection with a terminal device by means of the connecting terminal, and to be capable of issuing broadcast information by means of the wireless communication module, the broadcast information comprising identity information of the terminal device connected to the battery pack; and an electronic device, the electronic device being configured to be capable of receiving the broadcast information, and to be capable of operably establishing a wireless connection with the battery pack, wherein the electronic device is further configured to be capable, in a state of having established a wireless connection, of storing identity information of the terminal device, and in a state of the wireless connection being broken, on the basis of the identity information in received said broadcast information matching the stored identity information, automatically establishes a wireless connection with the battery pack which issues the broadcast information.

In some embodiments, the battery pack is further configured such that a wireless connection between the battery pack and the electronic device is broken at the same time as a connection between the battery pack and the terminal device is broken.

In some embodiments, the electronic device is further configured to be capable, on the basis of a user operation, of breaking, from the electronic device side, a wireless connection with the battery pack.

In some embodiments, the electronic device is further configured such that, when a wireless connection with the battery pack is broken on the basis of the user operation, identity information of the terminal device associated with the disconnected battery pack is deleted in the stored information of the electronic device.

In some embodiments, the electronic device is further configured to be capable of establishing a wireless connection with the battery pack, on the basis of a user operation, when the identity information in received said broadcast information does not match the stored identity information.

In some embodiments, the identity information comprises an ID or MAC address of the terminal device.

In some embodiments, the broadcast information further comprises state information of the terminal device connected to the battery pack, and/or the broadcast information further comprises identity information and/or state information of the battery pack.

In some embodiments, the wireless communication module is configured to send out the broadcast information and establish a wireless connection with the electronic device, by means of a Bluetooth low energy (BLE) protocol.

In some embodiments, the wireless communication module is integrated in the battery pack, or the wireless communication module is detachably mounted to the battery pack.

In some embodiments, the terminal device comprises a power tool, a charger, an adapter or another battery pack.

According to another aspect of the present invention, a control method for an IoT system is further provided, the IoT comprising a battery pack provided with a connecting terminal and wireless communication module, a terminal device and an electronic device, and the control method comprising the following steps:

establishing an electrical connection and communication connection between the terminal device and the battery pack by means of the connecting terminal of the battery pack;

the battery pack issuing broadcast information, and the broadcast information comprising identity information of the terminal device;

the electronic device receiving the broadcast information, and comparing the identity information in the broadcast information with identity information stored on the electronic device; and in a scenario in which the identity information in the broadcast information matches the identity information stored on the electronic device, the electronic device automatically establishing a wireless connection with the battery pack.

In some embodiments, a wireless connection between the battery pack and the electronic device is broken when a connection between the battery pack and the terminal device is broken.

In some embodiments, when the identity information in received said broadcast information does not match the stored identity information, a user operation causes the electronic device to establish a wireless connection with the battery pack.

In some embodiments, when a wireless connection with the battery pack is broken from the electronic device side, identity information of the terminal device associated with the disconnected battery pack is deleted in the stored information of the electronic device.

In some embodiments, the identity information comprises an ID or MAC address of the terminal device.

In some embodiments, the battery pack sends out the broadcast information and establishes a wireless connection with the electronic device, by means of a Bluetooth low energy (BLE) protocol.

BRIEF DESCRIPTION OF THE DRAWINGS

To better understand the above and other objectives, features, advantages and functions of the present invention, reference may be made to the preferred embodiments shown in the drawings. In the drawings, identical reference symbols denote identical components. Those skilled in the art should understand that the drawings are intended to illustrate preferred embodiments of the present invention schematically and have no limiting effect on the scope of the present invention, and the various components in the drawings are not drawn to scale.

SPECIFIC EMBODIMENTS

Figure 1:
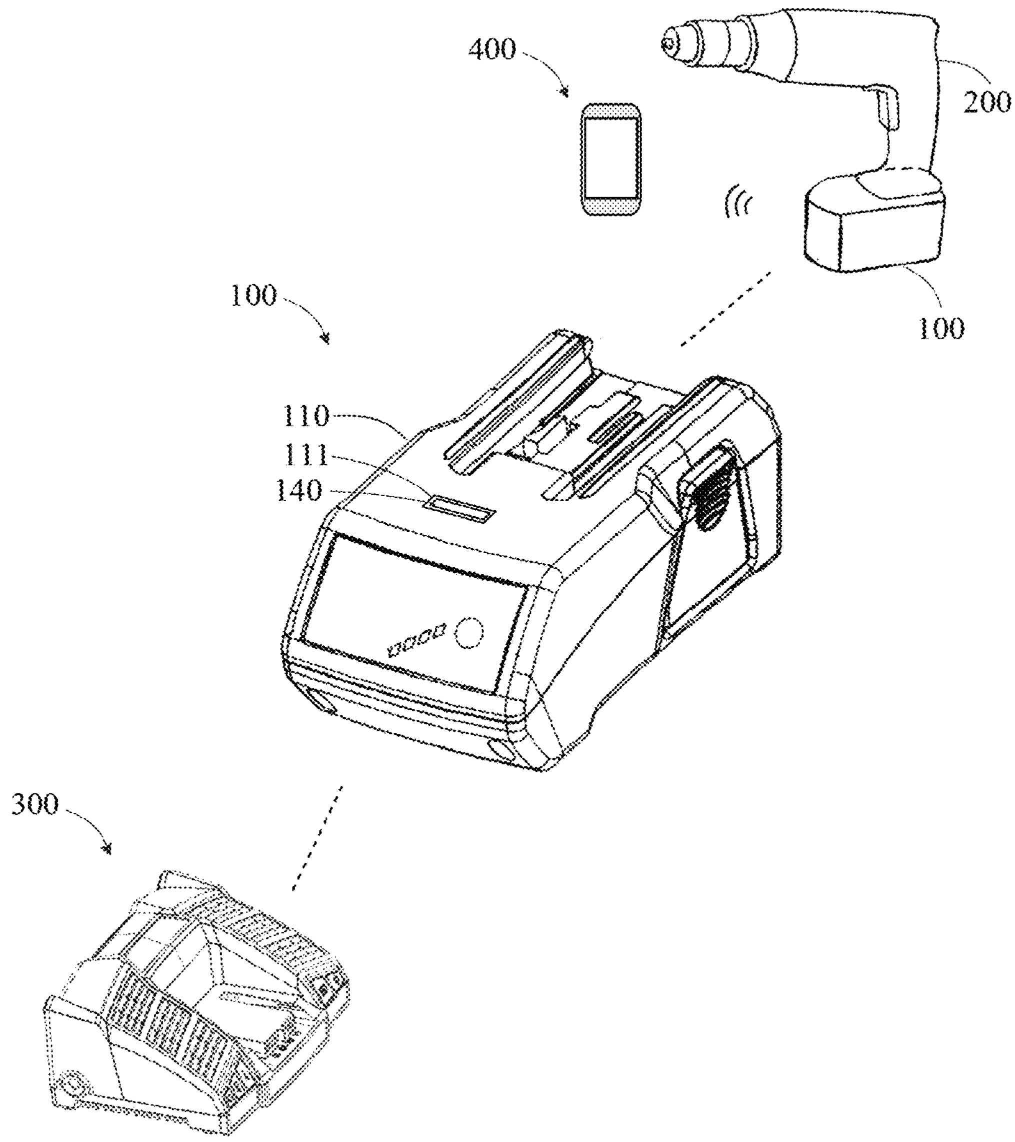
FIG. 1 is a schematic drawing of an IoT according to a preferred embodiment of the present invention.

Specific embodiments of the present invention are now described in detail by referring to the drawings. The embodiments described herein are merely preferred embodiments of the present invention. Based on these preferred embodiments, those skilled in the art will be able to think of other ways in which the present invention could be implemented, all of which likewise fall within the scope of the present invention.

The present invention provides an IoT system and a control method therefor. As shown in FIG. 1, in some embodiments, the IoT system may comprise a battery pack 100, a terminal device and an electronic device 400. The battery pack 100 can electrically connect to the terminal device, for supplying power to the terminal device or for being charged by the terminal device. FIG. 1 shows an electric tool 200 acting as a terminal device (the battery pack 100 being used for supplying power) and a charger 300 (used for charging the battery pack 100). In embodiments not shown, the terminal device further may be a domestic cleaning device, a kitchen device, a medical device, etc. In addition, the terminal device further may be an adapter, or a different battery pack from another group, etc.

The electronic device 400 may be, for example, a smart phone, tablet computer, etc., and can establish a network connection with the battery pack 100 and terminal device. A user may use the electronic device 400 to obtain relevant information of the battery pack 100 and terminal device via a network connection, for example charge level, temperature, etc. of the battery pack 100, and operating state of the terminal device (such as on/off state, rotation speed, temperature), etc. Furthermore, the user further can use the electronic device 400 to control the battery pack 100 and terminal device via a network connection, for example to set operating parameters, change operating mode, etc.

Figure 2:
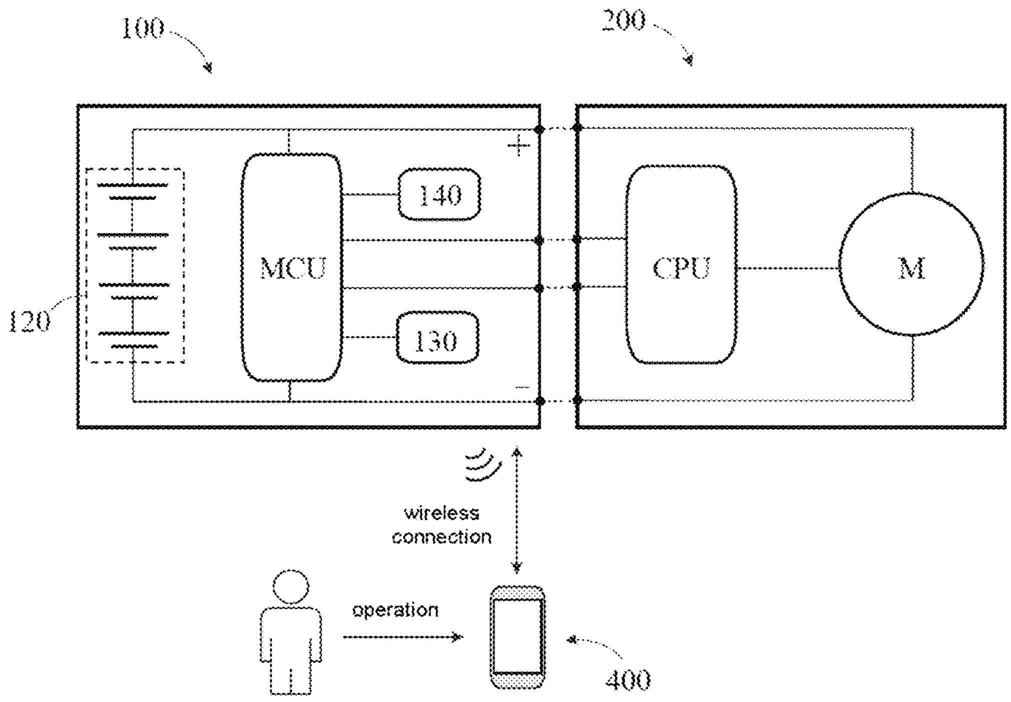
FIG. 2 is a schematic drawing of an initial connection of an IoT.

In view of FIGS. 1 and 2, it can be seen that in some embodiments the battery pack 100 may comprise a housing 110 and a battery unit 120 composed of multiple cells. Said battery cell preferably is a rechargeable secondary battery. The battery unit 120 is arranged in an accommodating space formed by the housing 110, and is used for storing electrical energy. The housing 110 is provided with a connecting structure (not shown), which may connect to another connecting structure of complementary shape on the terminal device, and thereby the battery pack 100 is attached to the terminal device. An example of connecting structures of complementary shapes may be a sliding rail and sliding slot, a snap-fit connector and engagement slot, etc. The battery pack 100 and terminal device may be respectively provided with connecting terminals which can cooperate with each other (for example, a male terminal and a female terminal). In a state in which the battery pack 100 is attached to the terminal device, the two simultaneously connect by means of the connecting terminals. The connecting terminals may comprise positive and negative pole terminals for transmitting electrical energy, and communication terminals for transmitting electrical signals. That is, the battery pack 100 can establish an electrical connection and communication connection with the terminal device by means of the connecting terminals. In this way, an MCU of the battery pack 100 and a CPU or MCU of the terminal device can exchange respective data information thereof, with each other, via a communication connection. The battery pack 100 further comprises a storage module 130 electrically connected to the MCU, and, by means of the storage module 130, may store and record data information of the battery pack 100 itself, and relevant data information of the terminal device connected to said battery pack 100.

Continuing to refer to FIGS. 1 and 2, the battery pack 100 further comprises a wireless communication module 140 electrically connected to the MCU. The battery pack 100 can establish a wireless connection with an external electronic device 400, by means of the wireless communication module 140, and exchanges data information via the wireless connection. Preferably, the wireless communication module 140 may be configured to be capable of realising a wireless connection based on protocols of Bluetooth technology, Bluetooth low energy (BLE) technology, etc. In some embodiments, the wireless communication module 140 may be constructed in the form of an independently provided electronic card, which is integrally provided with the necessary components for wireless communication such as a control circuit and an antenna. Correspondingly, as shown in FIG. 1, the housing 110 of the battery pack 100 is provided with an insertion slot 111. The electronic card may be attached to the battery pack 100 by means of insertion into the insertion slot 111, and electrically connects to the MCU by means of a structure such as an electrical terminal or electrical contact. In some embodiments, the wireless communication module 140 further may be integrally arranged in the battery pack 100, and even further may be constructed as a part of a battery management system (BMS) of the battery pack 100.

The electronic device 140 may be pre-installed with a specific application program, which is adapted to a communication protocol used by the wireless communication module 140. As shown in FIG. 2, the electronic device 400, on the basis of an operation instruction input by a user, may, by means of inputting or scanning an identity identifier, or by means of searching for a wireless signal of a battery pack 100 desired to be connected, etc., discover said battery pack 100, and then perform identity authentication by means of a handshake request, thereby realising a connection. In this way, the electronic device 400 is added to an IoT formed by the battery pack 100 and the terminal device connected thereto. At this time, the electronic device 400 may obtain state parameter and other information of the battery pack 100 itself, and also, via the battery pack 100, may obtain state parameter and other information of a connection of a terminal device connected to the battery pack 100. Furthermore, in a wireless connection state, the electronic device 400, on the basis of an operation instruction input by a user, further may set parameters for the battery pack 100 and terminal device connected thereto. The set parameters, for example, may be time update, operating mode, overcurrent protection, over temperature protection, etc. When the terminal device is a power tool 200, parameter setting may be for parameters such as tool rotation speed and torque. In addition, a locked state and unlocked state of the battery pack 100 and terminal device may further be set by means of the electronic device 400.

It will be understood that, when the terminal device is a power consumption apparatus, in a continuous operating state, the battery pack 100 is limited to its own capacity, and it tends to be difficult to continuously supply energy over a long time, and therefore, after the charge in the battery pack 100 is used up, it is necessary to frequently replace it. Regarding the electronic device 400, every time the battery pack 100 is replaced, it is necessary to establish a new wireless connection with the newly replaced battery pack 100. If each connection requires an active operation by a user, this is inconvenient and cumbersome.

The technical solution of the present invention, to a certain extent, mitigates the inconvenience brought about by the above problem, realising a fast and convenient connection between an electronic device and new battery pack, in a scenario in which a terminal device does not change and the battery pack is replaced. According to the technical solution of the present invention, a wireless communication module of the battery pack is configured to be capable of sending out broadcast information in a broadcast mode, wherein the broadcast information may comprise identity information of a terminal device connected thereto; for example, identity information may be an ID or MAC address of said terminal device. In other words, the identity information uniquely corresponds to the terminal device, and may be seen as an identity identifier of said terminal device. The electronic device is further configured to be capable of obtaining and storing, via a battery pack, identity information of the terminal device connected to said battery pack, when a wireless connection is maintained with the battery pack before replacement.

After replacement with a new battery pack, said new battery pack sends out broadcast information. The electronic device can receive the broadcast information, and then reads identity information in the broadcast information, and compares same with already stored identity information. If identity information in the received broadcast information matches identity information already stored in the electronic device, for example if an ID or MAC address in the broadcast information is the same as an ID or MAC address already stored in the electronic device, or correspondence is possible based on a specific encryption algorithm, then it is determined that a terminal device connected to said battery pack was connected to the electronic device before the battery pack was replaced. The electronic device thus automatically establishes a wireless connection with a battery pack which issues broadcast information containing matching identity information, and does not require an active operation of a user. In this way, the electronic device can automatically, via a replacement battery pack, re-establish an IoT connection with a terminal device with which an IoT connection had already been established before battery pack replacement, thereby dispensing with the trouble of requiring a user to frequently perform an active operation, which is highly advantageous in a scenario which requires a terminal device to operate for a long time and a battery pack to be replaced frequently.

Figure 3:
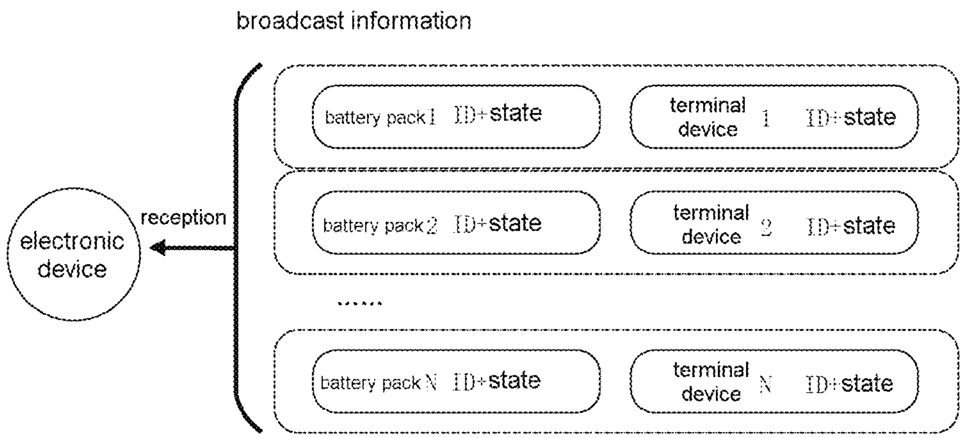
FIG. 3 is a schematic drawing of a battery pack of an IoT sending broadcast information.
Figure 4:
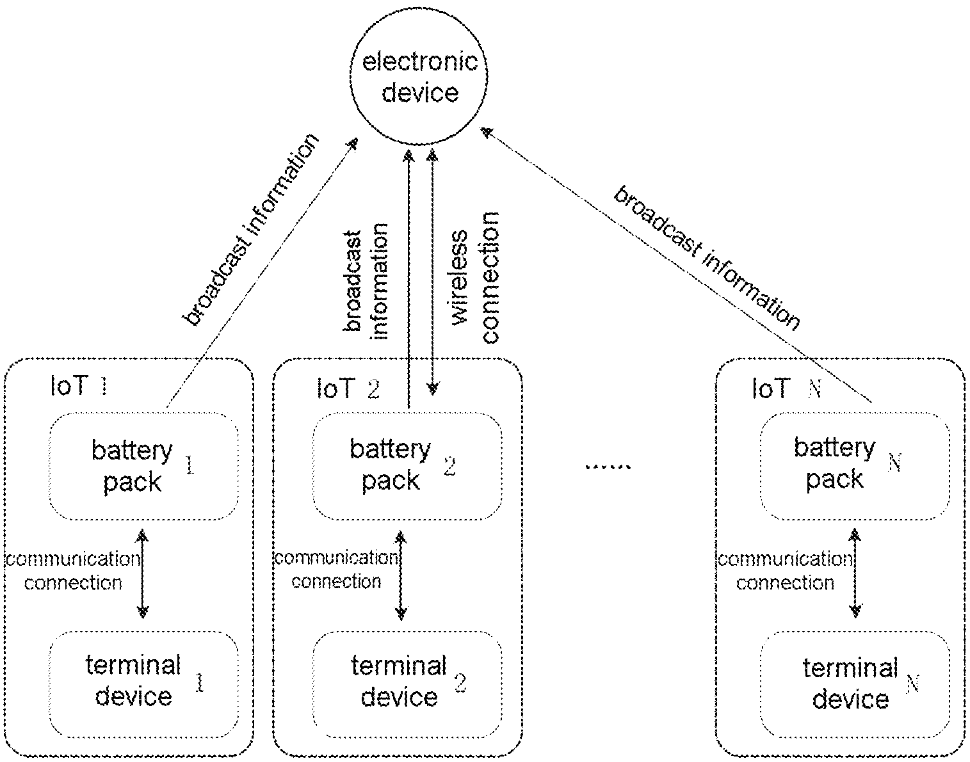
FIG. 4 is a schematic drawing of an electronic device in an IoT receiving broadcast information and automatically connecting.

For example, multiple IoTs are present in the scenarios shown in FIGS. 3 and 4: IoT 1, IoT 2, . . . , IoT N. Each IoT comprises a terminal device and a battery pack connected (electrical connection and communication connection) to said terminal device. The battery pack in each IoT can send out broadcast information by means of its own wireless communication module. The electronic device can receive the broadcast information issued by the battery pack of each IoT, and reads identity information in each group of broadcast information. Next, the electronic device can compare the read identity information in each group of broadcast information with stored identity information. For example, identity information in broadcast information issued by the battery pack 2 in the IoT 2 matches identity information stored and recorded in an electronic device, hence the electronic device, on the basis of a comparison result of matching, automatically establishes a wireless connection with the battery pack 2. It will be understood that, under the premise that a wireless communication protocol allows it, when identity information in multiple groups of broadcast information matches multiple groups of identity information stored in an electronic device, the electronic device may respectively establish automatic wireless connections with multiple corresponding battery packs. That is, the electronic device may separately belong to multiple different IoTs.

In addition, it will be understood that for an IoT in which identity information in broadcast information does not match identity information stored in an electronic device, if a user desires to cause the electronic device to establish a wireless connection therewith, the user may actively input an operation instruction, search for a wireless signal of a battery pack 100 desired to be connected, and then, by means of a handshake request, authenticate the identity of the battery pack desired to be connected to, thereby realising a connection.

When it is desired to break a wireless connection between an electronic device and another device in an IoT, a user, by means of actively inputting an operation instruction, may break a wireless connection with a battery pack at the electronic device side. Preferably, when the wireless connection with the battery pack is actively broken at the electronic device side, the electronic device may delete stored identity information corresponding to the already disconnected terminal device in the IoT, in order to avoid, when continuing to receive broadcast information issued by the battery pack of said IoT after breaking the wireless connection, still automatically establishing an undesired wireless connection.

Preferably, the battery pack may be configured such that a wireless connection between the battery pack and the electronic device is broken at the same time as a connection between the battery pack and the terminal device is broken. In this way, it is possible to avoid the battery pack, after being removed from the IoT, still maintaining a wireless connection with the electronic device, thereby avoiding taking up processor resources of an electronic device excessively and unnecessarily.

Continuing to refer to FIG. 3, it can be seen that, apart from identity information of a terminal device, broadcast information further may comprise state information of the terminal device, and furthermore may further comprise identity information and/or state information of a battery pack. For the terminal device, state information may be on/off state, operating mode, rotation speed, temperature, remaining life of easily worn components, etc. For the battery pack, identity information may be information, such as ID or MAC address of the battery pack, which can be used for indicating the identity of the battery pack, and state information may be information such as battery pack charge level, current, voltage, temperature and health condition. In this way, even if the electronic device does not establish a wireless connection with the battery pack, it may still passively obtain information of a relevant device in an IoT by means of receiving broadcast information, but cannot actively control the device in the IoT. Preferably, a wireless communication module of the battery pack may be configured to periodically send out broadcast information, for example broadcasting once every 2 s or predetermined time of another numerical value.

The above description of various embodiments of the present invention is provided for descriptive purposes to a person of ordinary skill in the art. It is not intended that the present invention be exclusive or limited to a single disclosed embodiment. As mentioned above, those skilled in the art will understand various alternatives and variations of the present invention. Thus, although some alternative embodiments have been specifically described, those skilled in the art will understand, or develop with relative ease, other embodiments. The present invention is intended to include all alternatives, modifications and variants of the present invention described here, as well as other embodiments which fall within the spirit and scope of the present invention described above.

The invention claimed is:

1. An IoT system, characterised in that the system comprises:

a battery pack, the battery pack being provided with a connecting terminal and a wireless communication module, the battery pack being configured to be capable of establishing an electrical connection and communication connection with a terminal device by means of the connecting terminal, and to be capable of issuing broadcast information by means of the wireless communication module, the broadcast information comprising identity information of the terminal device connected to the battery pack; and an electronic device, the electronic device being configured to be capable of receiving the broadcast information, and to be capable of operably establishing a wireless connection with the battery pack, wherein the electronic device is further configured to be capable, in a state of having established the wireless connection, of storing identity information of the terminal device, and in a state of the wireless connection being broken, on the basis of the identity information in received said broadcast information matching the stored identity information, automatically establishes the wireless connection with the battery pack which issues the broadcast information.

2. The IoT system according to claim 1, characterised in that the battery pack is further configured such that the wireless connection between the battery pack and the electronic device is broken at the same time as a connection between the battery pack and the terminal device is broken.

3. The IoT system according to claim 1, characterised in that the electronic device is further configured to be capable, on the basis of a user operation, of breaking, from the electronic device side, the wireless connection with the battery pack.

4. The IoT system according to claim 3, characterised in that the electronic device is further configured such that, when the wireless connection with the battery pack is broken on the basis of the user operation, identity information of the terminal device associated with the disconnected battery pack is deleted in the stored information of the electronic device.

5. The IoT system according to claim 1, characterised in that the electronic device is further configured to be capable of establishing the wireless connection with the battery pack, on the basis of a user operation, when the identity information in received said broadcast information does not match the stored identity information.

6. The IoT system according to claim 1, characterised in that the identity information comprises an ID or MAC address of the terminal device.

7. The IoT system according to claim 1, characterised in that the broadcast information further comprises state information of the terminal device connected to the battery pack, and/or the broadcast information further comprises identity information and/or state information of the battery pack.

8. The IoT system according to claim 1, characterised in that the wireless communication module is configured to send out the broadcast information and establish the wireless connection with the electronic device, by means of a Bluetooth low energy (BLE) protocol, and preferably, the wireless communication module is integrated in the battery pack, or the wireless communication module is detachably mounted to the battery pack.

9. The IoT system according to claim 1, characterised in that the terminal device comprises a power tool, a charger, an adapter or another battery pack.

10. A control method for IoT system, characterised in that the IoT comprises a battery pack provided with a connecting terminal and wireless communication module, a terminal device and an electronic device, and the control method comprises the following steps:

establishing an electrical connection and communication connection between the terminal device and the battery pack by means of the connecting terminal of the battery pack;

the battery pack issuing broadcast information, and the broadcast information comprising identity information of the terminal device;

the electronic device receiving the broadcast information, and comparing the identity information in the broadcast information with identity information stored on the electronic device; and in a scenario in which the identity information in the broadcast information matches the identity information stored on the electronic device, the electronic device automatically establishing a wireless connection with the battery pack.

11. The control method according to claim 10, characterised in that when a connection between the battery pack and the terminal device is broken, the wireless connection between the battery pack and the electronic device is broken.

12. The control method according to claim 10, characterised in that, when the identity information in received said broadcast information does not match the stored identity information, a user operation causes the electronic device to establish the wireless connection with the battery pack.

13. The control method according to claim 10, characterised in that when the wireless connection with the battery pack is broken from the electronic device side, identity information of the terminal device associated with the disconnected battery pack is deleted in the stored information of the electronic device.

14. The control method according to claim 10, characterised in that the identity information comprises an ID or MAC address of the terminal device.

15. The control method according to claim 10, characterised in that the battery pack sends out the broadcast information and establishes the wireless connection with the electronic device, by means of a Bluetooth low energy (BLE) protocol.

* * * * *